July 22, 1930.  C. S. MORGAN  1,771,134

INSULATION FOR PIPE FITTINGS

Filed Nov. 14, 1927

INVENTOR.
CLARENCE STANLEY MORGAN.
BY
*JKing Harness*
ATTORNEY.

Patented July 22, 1930

1,771,134

UNITED STATES PATENT OFFICE

CLARENCE STANLEY MORGAN, OF DETROIT, MICHIGAN

INSULATION FOR PIPE FITTINGS

Application filed November 14, 1927. Serial No. 232,993.

My invention relates particularly to formed insulation for pipefittings of various kinds and has for one of its primary objects the construction of such insulation in a manner which will permit the same to be used with various types or makes of fittings and which will accurately center the insulation for assembly purposes.

One of the important features of my invention is the provision of an inwardly extending flange or ring on the insulation which will act as a centering guide therefor on the pipe to which the fitting is joined and will also act as a locating point for such insulation as is placed on the pipe.

With the above and other objects in view, my invention consists in the arrangement, combination and construction of the various parts of my improved device, as described in the specification, claimed in my claims and shown in the accompanying drawing, in which:

Figure 1:
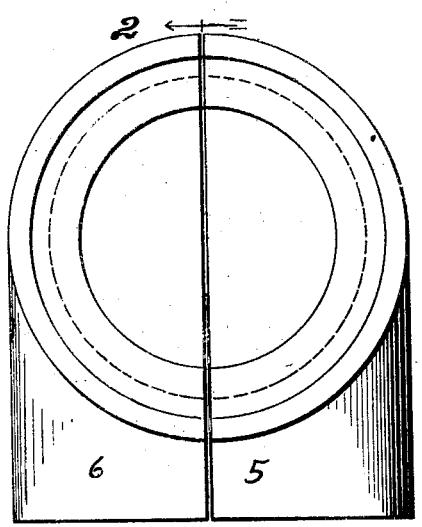
Fig. 1 is an elevation showing in assembled position the two halves of an insulation element for an elbow fitting.
Figure 2:
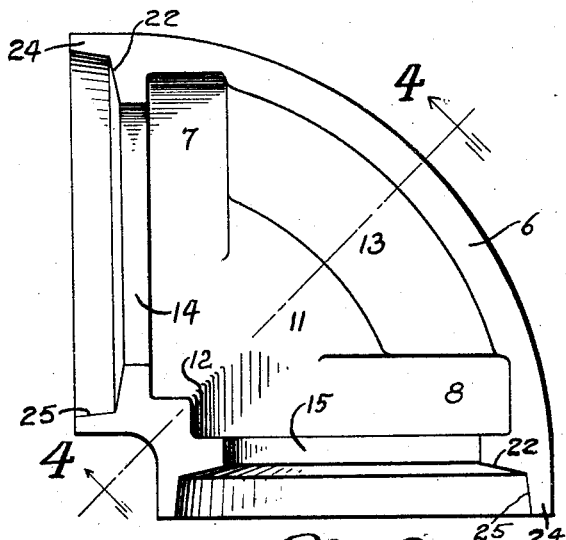
Fig. 2 is a view taken on line 2—2 of Fig. 1.

I have shown a pair of insulation members 5 and 6 which are identical in form and which may be placed together as shown in Fig. 2 to form a complete enclosure for an elbow fitting.

As will be particularly seen in Fig. 2 the inner bearing face of each insulation member resembles in formation an elbow fitting. I have provided transversely extending curved grooves 7 and 8 in the insulation for the purpose of receiving the flanges 9 and 10 of an elbow fitting. I have also provided a central depressed portion or longitudinally extending curved groove 11 which is approximately at the intersection of the longitudinal and transverse center lines of the insulation and serves to make possible the use of the insulation member on various types of fittings. That is to say, the insulation may be used on either cast or malleable fittings and will conform to the shape of fittings made by different manufacturers. The bearing face of the insulation at the inner corner of the same is arched as at 12 so that it may bear on the body of the heavier types of cast fittings sold by some manufacturers.

In order to definitely locate the insulation during assembly, I provide each half with a pair of inwardly extending flanges 14 and 15, which flanges are adapted to mate with flanges on the other insulation member to form a continuous ring whose inner bearing surface contacts against the pipes 16 and 17 which are secured in the elbow fitting 18 and which are held to relatively close limits by all manufacturers. The sides of the flanges adjacent the fitting 18 co-operate with the ends thereof as at 19 and 20 to locate the insulation relative to the ends of the fitting.

Figure 3:
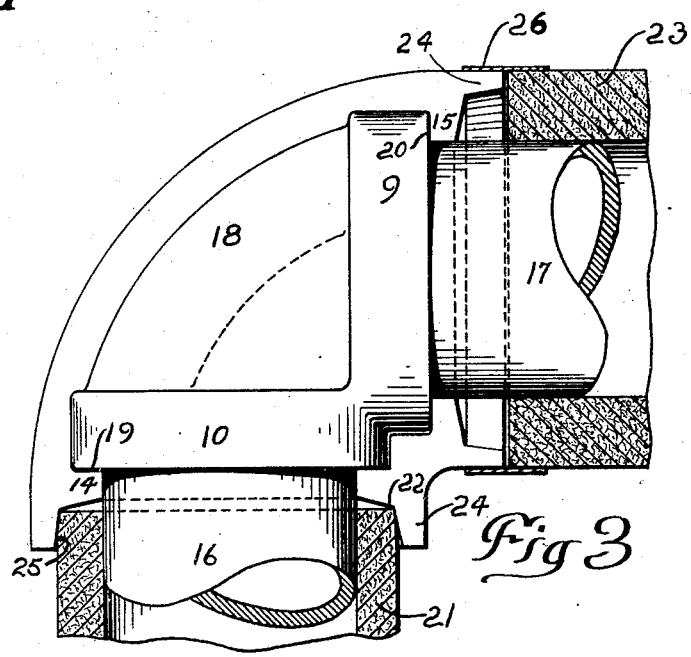
Fig. 3 is a view similar to that of Fig. 2 with the addition of the elbow fitting and its pipe connections as well as the insulation for the pipe connections, such insulation being shown in section.
Figure 4:
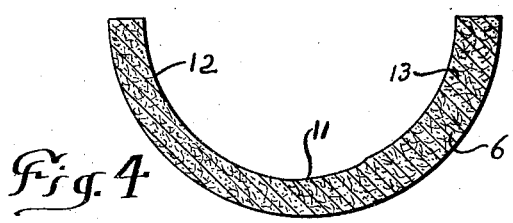
Fig. 4 is a view taken on line 4—4 of Fig. 2.

The other sides of the flanges 14 and 15 act as stops or locating points 22 for the insulation 21 shown in the lower end of the insulation for the fitting in Fig. 3, which insulation is received within the extended end 24 of the fitting insulation and is squeezed into contact with the pipe 16 by the inner tapered walls to hold the insulation 21 together and prevent a circulation of air through the joint between the same and the fitting insulation. Where a thicker pipe insulation such as 23 is employed, it may abut against the extended end 24 of the fitting insulation as shown in the upper part of Fig. 3, and a strap such as 26 may be extended around the joint to hold both halves of the fitting insulation and the pipe insulation together and in place, as well as to seal the joint between the same against the circulation of air. At the same time, when the pipe insulations 21 and 23 are forced against the flanges 22 and ends 24 respectively, they tend to align the fitting insulation with them.

It will be apparent that when malleable and the smaller types of cast fittings are used, the only points of contact between the insulation halves 5 and 6 and the fitting 18 and pipes 16 and 17 may be where the flanges 14 and 15 contact against the pipes 16 and 17, and in such case the remainder of the halves 5 and 6 will be spaced from the fitting 18. This feature is not detrimental to the effectiveness of the insulation as in such case a dead air space is formed between the fitting 18 and the inner surface of the halves 5 and 6, any circulation of air in the same being prevented by the joint between the flanges 14 and 15 and the pipes 16 and 17.

It will be apparent that when the two insulation members 5 and 6 are placed together and cemented or otherwise united, a unitary insulation structure is provided which may be easily and quickly assembled by unskilled labor and which will provide a universally formed insulation of ornamental appearance. It will be readily understood that the insulation may be applied to other types of fittings and that the illustration of the same applied to an elbow fitting is only one form of my invention.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. Fitting insulation comprising a pair of members having depressions therein adapted to mate and enclose a fitting, said members each having a curved groove therein extending lengthwise of the depressions.

2. Fitting insulation comprising a pair of members having depressions therein adapted to mate and enclose a fitting, said members each having a transversely extending curved groove in the depressions.

3. In combination, a pipe having a fitting thereon, insulation enclosing the fitting and having an inwardly extending flange centering on the pipe, said flange being adjacent to but inwardly of one end of the insulation, and further insulation on the pipe having an end located on the said centering flange and enclosed by the end of said first insulation.

4. In combination, a pipe having a fitting thereon, insulation enclosing the fitting and having an inwardly extending flange centering on the pipe, and further insulation on the pipe having an end located on the said centering flange, said first insulation having a portion extending beyond the flange thereon and enclosing a portion of the pipe insulation and enclosed by the end of said first insulation.

5. Fitting insulation comprising a pair of members adapted to mate and enclose a fitting, a pair of transverse grooves in each member, a longitudinal groove joining the said two grooves, a portion of each member between the pair of grooves and adjacent the longitudinal groove being depressed to a point lower than the longitudinal groove.

CLARENCE STANLEY MORGAN.